Figure 1:
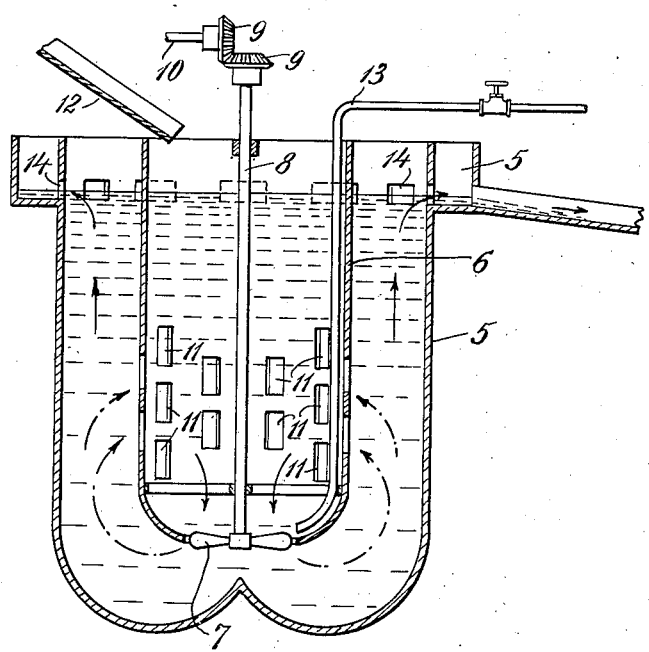

Nov. 27, 1934.  R. S. HATCH  1,982,002

METHOD OF BLEACHING PAPER PULP

Filed March 23, 1932

INVENTOR
Raymond S. Hatch
BY
Pennie Davis Marvin & Edmonds
ATTORNEYS

Patented Nov. 27, 1934

1,982,002

UNITED STATES PATENT OFFICE 1,982,002

METHOD OF BLEACHING PAPER PULP

Raymond S. Hatch, East Orange, N. J., assignor to International Bleaching Corporation, New York, N. Y., a corporation of Delaware Application March 23, 1932, Serial No. 600,631

18 Claims. (Cl. 8—2)

This invention relates to a method of bleaching cellulosic material with chlorine.

In a co-pending application Ser. No. 508,510 filed January 13, 1931, an improved method of treating cellulosic material with chlorine is described. The invention of that application permits the avoidance of difficulties encountered heretofore in the application of chlorine as a bleaching agent and permits the application of chlorine as an economical and satisfactory bleaching agent to paper pulp and the like. The use of the invention affords numerous advantages and among others the rapidity and simplicity of the operation as compared with the methods employing hypochlorites which have been used universally in commercial operations prior to the invention.

The method as described in said co-pending application depends upon the principle that the quantity (weight) of chlorine introduced relative to the quantity (weight) of liquid employed should be such that the chlorine is readily and quickly dissolved in the liquid. In the method as described, the ratio of the weight of the chlorine introduced to the weight of the water employed as the liquid medium should be such that the chlorine content of the water at the point of introduction of the chlorine never exceeds and preferably does not too closely approach the limit of solubility of about 6.9 grams per liter at 68° F.

The dissolving of the chlorine as it is introduced is facilitated by rapid dissemination in a relatively large proportion of liquid. This can be accomplished in various ways. As described in said co-pending application, the most satisfactory operation involves the agitation of the liquid violently near the point of introduction of the chlorine. Agitation prevents the formation of bubbles of chlorine and the ultimate escape thereof before solution is accomplished. The chlorine is distributed so that it is dissolved readily and completely by the liquid near the point of introduction. The agitation should be conducted in such a way as to ensure the maximum flow of liquid past the point of introduction of the chlorine. Thus fresh liquid is constantly supplied at the point of introduction of the chlorine and the liquid is enabled to dissolve the chlorine as rapidly as it is supplied.

It is the object of the present invention to afford an improved operation involving the principle of said copending application, but permitting continuous operation, that is to say, the continuous introduction of the material to be chlorinated to the chlorination zone and the continuous withdrawal of the chlorinated material.

Another object of the invention is to afford a simple, effective, economical and commercial method for the treatment of cellulosic material with chlorine to effect the bleaching of the material or to prepare the material for further bleaching operations.

In carrying out the invention, the pulp or other cellulosic material must be subjected to the action of the chlorine, and this is effected by suspending the fibres in water which forms the liquid medium. It is impractical to secure proper distribution of the chlorine if the pulp is too concentrated. Moreover, it is essential to have a large proportion of the liquid relatively to the weight of the chlorine introduced. The latter factor is determined by the bleaching to be accomplished. It is desirable to employ concentrations below 4% and preferably not higher than 2½% to 4%. The use of low concentrations is dictated, moreover, where agitation is employed, by the heavy power consumption necessary to agitate effectively a pulp of concentration exceeding 4%. Preferably the concentration should be such that each fibre swims freely in the liquid. Matting of the pulp and the entrapping of bubbles of chlorine is thus avoided.

It will be understood that the encrusting material in the pulp has a strong affinity for the chlorine, and the chlorine dissolved in the liquid is consumed rapidly, particularly where the fibres are swimming freely and are thus fully exposed to the action of the chlorine. Consumption of the dissolved chlorine is, in fact, so rapid that chlorine can be introduced continuously to the liquid during the bleaching operation. The chlorine thus introduced is dissolved as rapidly as it is supplied and replaces that which reacts with the pulp, and it in turn reacts and is replaced in the solution.

To accomplish the purpose most effectively, the pulp in suspension is preferably circulated continuously from and toward the point at which the chlorine is supplied. This circulation ensures the maximum flow of liquid past the point of introduction of the chlorine. Thus the chlorine is dissolved and then reacts as the pulp circulates, the liquid being, upon its return to the point of supply, again sufficiently depleted in chlorine to dissolve an additional amount. Preferably the circulation is quite rapid, as the time required for solution and subsequent depletion of the chlorine is relatively short. Moreover, the rapid circulation ensures the maximum rate of introduction of the chlorine and rapid bleaching of the pulp.

In practicing the invention, it is desirable to provide a suitable receptacle for the pulp with a zone of circulation and agitation and relatively quiescent zones to which the pulp is supplied continuously and from which it is withdrawn. The chlorine, either in the gaseous state or in the form of a liquid which will gasify immediately as soon as the pressure is released, is supplied near the point of active agitation and at a rate which, in view of the agitation, ensures the effective and immediate solution of the chlorine in the liquid medium.

Suitable apparatus for accomplishing the purpose includes inner and outer receptacles, the inner receptacle having an opening at its bottom with a suitable propelling device adapted to be driven from an external source of power disposed in the opening, thus affording means for effecting active agitation of the pulp as it flows from one receptacle into the other. The inner receptacle may have openings in its walls communicating with the outer receptacle, so that cross-circulation is permitted and the pulp flows continuously through the opening in the bottom of the inner receptacle and thence through the openings in the walls thereof. The openings in the walls of the inner receptacle may be disposed only in the lower portion thereof or from near the bottom to a point from one-half to three-quarters of the distance to the top of the inner receptacle. The total area of these openings should be substantially equal to the cross section of the inner receptacle.

The pulp or other cellulosic material in liquid suspension can be introduced continuously at the top of the inner receptacle whence it flows downwardly through the opening in the bottom and circulates through the openings in the walls of the inner receptacle and thence again through the bottom thereof. The pulp may be withdrawn continuously through openings which deliver it to a launder surrounding the top of the outer receptacle. The direction of circulation of the pulp may be reversed, and if desired the flow of material may be introduced first to the outer receptacle and withdrawn from the inner receptacle.

As will be readily understood, the material introduced continuously flows into and mingles with the circulating mass to which the chlorine is introduced continuously and at a rate which ensures immediate solution of the chlorine in the liquid. From the circulating mass a portion of the material constantly rises and is withdrawn. The rate of feed and the rate of withdrawal may be constant and may be so adjusted as to ensure circulation of the material for a sufficient time to permit the introduction of the required amount of chlorine and the accomplishment of the purpose described.

Figure 2:
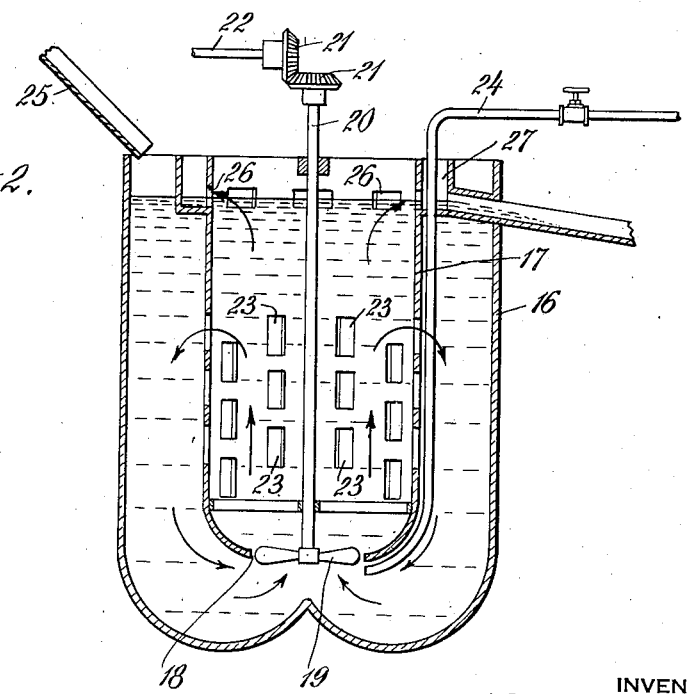

The details of procedure and of the apparatus employed will be better understood by reference to the following specification and accompanying drawing, in which Fig. 1 is a diagrammatic view of an apparatus adapted to accomplish the purpose of the invention; and Fig. 2 is a similar view of a slightly modified form of the apparatus.

In the apparatus as shown in Fig. 1 of the drawing, 5 indicates a receptacle of suitable size and form to receive a mass of fibres suspended in water which is to be treated with chlorine. The walls of the receptacle should be formed of material suitably resistant to chemical action by the materials introduced thereto. Within the receptacle 5 there is provided a vertically disposed degrader 6 in which the pulp is given a downward movement by means of an axial flow impeller 7 secured to a shaft 8 which extends downwardly into the degrader and which may be driven through suitable gearing 9 from a shaft 10, the latter being rotated by any suitable source of power. While an axial flow impeller is preferred, any other type of impeller which will cause a rapid agitation of the fibrous suspension and will impart the necessary velocity thereto may be used. A plurality of openings 11 are provided in the walls of the degrader 6 extending upwardly preferably about three-fourths of the height of the degrader to afford cross-circulation between the receptacle 5 and the degrader 6. The total area of these openings is preferably substantially equal to the area of the cross-section of the degrader.

A mass of pulp, preferably of a concentration between 2½% and 4% is fed continuously through a launder 12 to the top of the degrader and flows downwardly therein, being drawn toward the opening in the bottom by the impeller 7. At a point adjacent the impeller, chlorine is supplied at a suitable rate through a pipe 13. The agitation of the pulp by the impeller ensures the rapid and complete solution of the chlorine. The chlorinated pulp flows upwardly in the receptacle 5 and thence through the openings 11 in the wall of the degrader and is returned thus to the point at which chlorine is introduced. This circulation is continuous.

Some of the pulp escapes from the circulating body and rises in the receptacle 5 to a point near the top thereof where openings 14 afford passage therethrough to a launder 15 from which the pulp is continuously withdrawn. The rate of feed and withdrawal is so regulated that the pulp remains in the agitation zone for a sufficient period to ensure complete chlorination thereof. The pulp withdrawn from the comparatively quiescent zone near the top of the receptacle 5 is completely chlorinated.

In Fig. 2 of the drawing, another form of apparatus is illustrated which differs from the embodiment hereinbefore described merely in that it provides for upward circulation of the pulp in the inner receptacle. Thus I provide an outer receptacle 16 and an inner receptacle 17 having an opening 18 with an impeller 19 disposed therein which is driven through a shaft 20 and gears 21 from a shaft 22. Openings 23 are provided in the walls of the inner receptacle to permit cross-circulation. A pipe 24 conveys the chlorine to a point adjacent the impeller 19 at the bottom of the inner receptacle. The pulp is fed continuously through a launder 25, to the top of the outer receptacle, and is withdrawn continuously through openings 26 and a launder 27 at the top of the inner receptacle. Circulation is maintained as in the preceding embodiment of the invention, and chlorine is supplied continuously and at a suitable rate to effect the desired object.

As an example of the invention, a tank having a capacity of 6,000 cubic feet, which will hold approximately 360,000 pounds of water, may be employed. The pulp is suspended therein in a concentration of preferably from 2½% to 4%. The pulp may be introduced at the rate of, for example, six tons per hour and withdrawn at a similar rate. Chlorine may be introduced at the rate of from 10 to 15 pounds per minute, while the mass is being agitated and circulated in the manner described and while pulp is being introduced continuously and withdrawn continuously as hereinbefore indicated. At this rate the chlorine is dissolved immediately as it is introduced. The formation of bubbles is avoided and the chlorine is disseminated thoroughly throughout the mass. In the presence of the fibres the chlorine solution can never attain or even approach, under the conditions mentioned, the condition of saturation, and consequently none of the chlorine can escape. Preferably the mass is circulated at a high rate, for example, the entire mass may be forced past the point of introduction of the chlorine once each minute.

Regardless of the form of apparatus employed, the fibres should be more or less freely swimming in the water and the mixture should be agitated and moving at high velocity at the point where the chlorine is injected. This will ensure the fibres absorbing and exhausting a sufficient amount of chlorine in a relatively short period of time and will prevent any noticeable amounts of chlorine from escaping into the atmosphere.

The bleaching as carried out according to the method hereinbefore described may comprise the sole bleaching to which the cellulosic material is subjected, or it may be one of the steps of a multi-stage bleaching operation. It has been found that such a method is admirably suited as the first stage of a multi-stage bleaching operation or the last stage thereof, although its use is not so limited. Where the method is employed as the first stage of a multi-stage bleaching operation, the fibres may be washed before they are subjected to further bleaching steps.

The details of procedure as described, and particularly the quantities as specified and the details of apparatus illustrated in the drawing are merely illustrative of the invention, which may be carried out in various forms of apparatus and are subject to modifications with respect to quantities and rates of flow to accommodate it to the particular character of the material treated. Moreover, as hereinbefore indicated, the method may or may not comprise the sole bleaching operation to which the fibrous material is subjected.

Various changes may be made, therefore, in the invention as described without departing therefrom, and the claims appended hereto are intended to cover the method and apparatus with all modifications which may be utilized in accomplishing the purpose described.

I claim:

1. The method of bleaching paper pulp which comprises maintaining a zone of circulation of a water suspension of such pulp, maintaining relatively quiescent intake and discharge zones of such pulp, each in communication with the zone of circulation, constantly introducing pulp to the intake zone, passing pulp from the intake zone to the zone of circulation, repeatedly circulating pulp in the zone of circulation, the pulp then passing to the discharge zone, introducing chlorine into the suspension of pulp in the zone of circulation, and continuously discharging pulp from the discharge zone.

2. The method of bleaching paper pulp which comprises maintaining a body of a water suspension of such pulp, continuously introducing pulp into said body, maintaining that portion of the body into which the pulp is introduced relatively quiescent, maintaining another and a lower portion of said body in circulation, passing pulp from the aforesaid relatively quiescent zone to the zone of circulation, repeatedly circulating pulp in said zone of circulation, introducing chlorine into the body of pulp in the zone of circulation, maintaining a second portion of said body of pulp relatively quiescent, pulp passing from the zone of circulation after circulation therein to said second relatively quiescent portion of the body of pulp, and continuously discharging pulp from the second relatively quiescent zone.

3. The method of bleaching paper pulp which comprises maintaining a zone of circulation of a water suspension of such pulp, maintaining relatively quiescent intake and discharge zones of such pulp, each in communication with the zone of circulation, constantly introducing pulp to the intake zone, passing pulp from the intake zone to the zone of circulation, repeatedly circulating pulp in the zone of circulation, the pulp then passing to the discharge zone, introducing chlorine into the suspension of pulp in the zone of circulation at a rate such that in the presence of the pulp the solution cannot attain the concentration exceeding the solubility of the chlorine in water, and continuously discharging pulp from the discharge zone.

4. The method of bleaching paper pulp which comprises maintaining a zone of circulation of a water suspension of such pulp, maintaining relatively quiescent intake and discharge zones of such pulp, each in communication with the zone of circulation, constantly introducing pulp to the intake zone, passing pulp from the intake zone to the zone of circulation, repeatedly circulating pulp in the zone of circulation, the pulp then passing to the discharge zone, introducing chlorine into the suspension of pulp in the zone of circulation at a rate such that in the presence of the pulp the solution cannot attain a concentration exceeding the equivalent of 6.9 grams per liter at 68° F., and continuously discharging pulp from the discharge zone.

5. The method of bleaching paper pulp which comprises maintaining a body of a water suspension of such pulp containing not more than 4% of fiber in suspension, continuously introducing pulp into said body, maintaining that portion of the body into which the pulp is introduced relatively quiescent, maintaining another portion of said body in circulation, passing pulp from the aforesaid relatively quiescent zone to the zone of circulation, repeatedly circulating the pulp in said zone of circulation, introducing chlorine into said suspension of pulp in the zone of circulation, maintaining a second portion of said body of pulp relatively quiescent, pulp passing from the zone of circulation, after circulation therein, to said second relatively quiescent portion of the body of pulp, and continuously discharging pulp from said second relatively quiescent portion.

6. The method of bleaching paper pulp which comprises maintaining a zone of circulation of a water suspension of such pulp, maintaining relatively quiescent intake and discharge zones of such pulp, each in communication with the zone of circulation, constantly introducing pulp to the intake zone, passing pulp from the intake zone to the zone of circulation, repeatedly circulating pulp in the zone of circulation, the pulp then passing to the discharge zone, introducing chlorine into the suspension of pulp in the zone of circulation, agitating the pulp adjacent the point of introduction of the chlorine, and continuously discharging pulp from the discharge zone.

7. The method of bleaching paper pulp which comprises maintaining a zone of circulation of a water suspension of such pulp, maintaining relatively quiescent intake and discharge zones of such pulp, each in communication with the zone of circulation, constantly introducing pulp to the intake zone, passing pulp from the intake zone to the zone of circulation, repeatedly circulating pulp in the zone of circulation, the pulp then passing to the discharge zone, introducing chlorine into the suspension of pulp in the zone of circulation at a rate such that in the presence of the pulp the solution cannot attain a concentration exceeding the equivalent of 6.9 grams per liter at 68° F., agitating the pulp adjacent the point of introduction of chlorine, and continuously discharging pulp from the discharge zone.

8. The method of bleaching paper pulp which comprises maintaining a body of a water suspension of such pulp containing not more than 4% of fiber in suspension, continuously introducing pulp to said body, maintaining that portion of the body into which the pulp is introduced relatively quiescent, maintaining another portion of said body in circulation, passing pulp from the aforesaid relatively quiescent zone to the zone of circulation, repeatedly circulating pulp in the zone of circulation, introducing chlorine into said suspension of pulp in the zone of circulation, agitating pulp adjacent the point of introduction of the chlorine, maintaining a second portion of the body of pulp relatively quiescent, the pulp passing from the zone of circulation, after circulation therein, to said second relatively quiescent portion of the body of pulp, and continuously discharging pulp from said second relatively quiescent portion.

9. The method of bleaching paper pulp which comprises maintaining a body of a water suspension of such pulp, continuously introducing pulp into said body, maintaining that portion of the body into which the pulp is introduced relatively quiescent, maintaining another portion of said body in circulation, passing pulp from the aforesaid relatively quiescent portion to the zone of circulation, repeatedly circulating pulp in said zone of circulation, introducing chlorine into the suspension of pulp near the bottom of the zone of circulation, maintaining a second portion of said body of pulp relatively quiescent, the pulp passing from the zone of circulation, after circulating therein, to said second relatively quiescent portion of the body of pulp, and continuously discharging pulp from said second relatively quiescent zone.

10. The method of bleaching paper pulp which comprises maintaining a body of a water suspension of such pulp containing not more than 4% of fiber in suspension, continuously introducing pulp into said body, maintaining that portion of the body into which the pulp is introduced relatively quiescent, maintaining another portion of said body in circulation, passing pulp from the aforesaid relatively quiescent zone to the zone of circulation, repeatedly circulating pulp in the zone of circulation, introducing chlorine into the suspension of pulp near the bottom of the zone of circulation at a rate such that in the presence of the pulp the solution cannot attain a concentration exceeding the equivalent of 6.9 grams per liter at 68° F., maintaining a second portion of said body of pulp relatively quiescent, the pulp passing from the zone of circulation to said second relatively quiescent zone after circulating in the zone of circulation, and continuously discharging pulp from said second relatively quiescent zone.

11. The method of bleaching paper pulp which comprises maintaining a body of a water suspension of such pulp, continuously introducing pulp into said body, maintaining that portion of the body into which the pulp is introduced relatively quiescent, maintaining another portion of said body in circulation, passing pulp from the aforesaid relatively quiescent zone to the zone of circulation, repeatedly circulating pulp in the zone of circulation, introducing chlorine into the suspension of pulp near the bottom of the zone of circulation, agitating the pulp adjacent the point of introduction of the chlorine, maintaining a second portion of said body of pulp relatively quiescent, the pulp passing from the zone of circulation after circulating therein to said second relatively quiescent zone, and continuously discharging pulp from said second relatively quiescent zone.

12. The method of bleaching paper pulp which comprises maintaining a body of a water suspension of such pulp containing not more than 4% fiber in suspension, continuously introducing pulp into said body, maintaining that portion of the body into which the pulp is introduced relatively quiescent, maintaining another portion of said body in circulation, passing pulp from the aforesaid relatively quiescent zone to the zone of circulation, repeatedly circulating pulp in said zone of circulation, introducing chlorine into the suspension of pulp near the bottom of the zone of circulation at a rate such that in the presence of the pulp the solution cannot attain a concentration exceeding the equivalent of 6.9 grams per liter at 68° F., agitating the pulp adjacent the point of introduction of the chlorine, maintaining a second portion of said body of pulp relatively quiescent, pulp passing from the zone of circulation, after circulating therein, to said second relatively quiescent zone, and continuously discharging pulp from said second relatively quiescent zone.

13. The method of bleaching paper pulp which comprises maintaining a body of a water suspension of such pulp, continuously introducing pulp into said body, maintaining that portion of the body into which the pulp is introduced relatively quiescent, maintaining another portion of said body in circulation, gradually transferring pulp from the aforesaid relatively quiescent zone to the zone of circulation, repeatedly circulating pulp in the zone of circulation, introducing chlorine into said suspension of pulp in said zone of circulation, maintaining a second portion of said body of pulp relatively quiescent, the pulp gradually passing from the zone of circulation, after circulating therein, to said second relatively quiescent zone, and continuously discharging pulp from said second relatively quiescent zone.

14. The method of bleaching paper pulp which comprises maintaining a body of a water suspension of such pulp, continuously introducing pulp into said body, maintaining that portion of the body into which the pulp is introduced relatively quiescent, maintaining another and a lower portion of said body in circulation, gradually passing pulp from the aforesaid relatively quiescent zone to the zone of circulation, repeatedly circulating pulp in said zone of circulation, introducing chlorine into said suspension of pulp in said zone of circulation, maintaining a second portion of said body of pulp relatively quiescent, the pulp gradually passing from the zone of circulation, after circulating therein, to said second relatively quiescent zone, and continuously discharging pulp from said second relatively quiescent zone.

15. The method of bleaching paper pulp which comprises maintaining a body of a water suspension of such pulp, continuously introducing pulp to said body, maintaining that portion of the body into which the pulp is introduced relatively quiescent, maintaining another portion of said body in circulation, gradually transferring pulp from the aforesaid relatively quiescent zone to the zone of circulation, repeatedly circulating pulp in the zone of circulation, introducing chlorine into said suspension of pulp in the zone of circulation at a rate such that in the presence of the pulp the solution cannot attain a concentration exceeding the solubility of the chlorine in water, maintaining a second portion of said body of pulp relatively quiescent, the pulp passing from the zone of circulation after circulating therein to said second relatively quiescent zone, and continuously discharging pulp from said second relatively quiescent zone.

16. The method of bleaching paper pulp which comprises maintaining a body of a water suspension of such pulp, continuously introducing pulp into said body, maintaining that portion of the body into which the pulp is introduced relatively quiescent, maintaining another portion of said body in circulation, gradually transferring pulp from the aforesaid relatively quiescent zone to the zone of circulation, repeatedly circulating the pulp in said zone of circulation, introducing chlorine into the suspension of pulp near the bottom of the zone of circulation, maintaining a second portion of said body of pulp relatively quiescent, the pulp gradually passing from the zone of circulation, after circulating therein, to said second relatively quiescent zone, and continuously discharging pulp from said second relatively quiescent zone.

17. The method of bleaching paper pulp which comprises maintaining a body of a water suspension of such pulp, continuously introducing pulp into said body, maintaining that portion of the body into which the pulp is introduced relatively quiescent, maintaining another portion of said body in circulation, gradually transferring pulp from the aforesaid relatively quiescent zone to the zone of circulation, repeatedly circulating pulp in the zone of circulation, introducing chlorine into the suspension of pulp near the bottom of the zone of circulation, agitating the suspension of pulp adjacent the point of introduction of the chlorine, maintaining a second portion of said body relatively quiescent, the pulp gradually passing from the zone of circulation, after circulating therein, to said second relatively quiescent zone, and continuously discharging pulp from said second relatively quiescent zone.

18. The method of bleaching paper pulp which comprises maintaining a body of a water suspension of such pulp containing not more than 4% of fiber in suspension, continuously introducing pulp into said body, maintaining that portion of the body into which the pulp is introduced relatively quiescent, maintaining another portion of said body in circulation, gradually transferring pulp from the aforesaid relatively quiescent zone to the zone of circulation, repeatedly circulating the pulp in said zone of circulation, introducing chlorine into the suspension of pulp near the bottom of the zone of circulation at a rate such that in the presence of the pulp the solution cannot attain a concentration exceeding the equivalent of 6.9 grams per liter at 68° F., maintaining a second portion of said body relatively quiescent, the pulp passing from said zone of circulation, after circulating therein, to said second relatively quiescent zone, and continuously discharging pulp from said second relatively quiescent zone.

RAYMOND S. HATCH.